United States Patent

Heimann et al.

[11] Patent Number: 5,948,042
[45] Date of Patent: Sep. 7, 1999

[54] METHOD AND SYSTEM FOR UPDATING DIGITAL ROAD MAPS

[75] Inventors: Josef Heimann; Christian Hort, both of Düsseldorf; Thomas Weber, Hagen, all of Germany

[73] Assignee: Mannesmann Aktiengesellschaft, Düsseldorf, Germany

[21] Appl. No.: 08/676,086

[22] Filed: Jul. 2, 1996

[30] Foreign Application Priority Data

Jul. 3, 1995 [DE] Germany ............. 195 25 291

[51] Int. Cl.⁶ .......... G06F 165/00; G01C 21/00
[52] U.S. Cl. .......... 701/208; 701/117; 701/210
[58] Field of Search .......... 701/117, 208, 701/209, 210, 201, 213; 340/990, 995, 992; 348/148

[56] References Cited

U.S. PATENT DOCUMENTS

| | | | |
|---|---|---|---|
| 4,843,569 | 6/1989 | Sawada et al. | 364/518 |
| 4,891,761 | 1/1990 | Gray et al. | 364/452 |
| 4,994,971 | 2/1991 | Poelstra | 364/424.04 |
| 5,170,164 | 12/1992 | Lewis | 340/988 |
| 5,214,757 | 5/1993 | Mauney et al. | 395/161 |
| 5,557,524 | 9/1996 | Maki | 364/424.04 |
| 5,610,821 | 3/1997 | Gazis et al. | 364/444.2 |
| 5,638,116 | 6/1997 | Shimoura et al. | 348/118 |

FOREIGN PATENT DOCUMENTS

| | | |
|---|---|---|
| 41 05 584 | 2/1992 | Germany . |
| 42 20 963 | 1/1993 | Germany . |
| 42 30 299 | 3/1994 | Germany . |
| 43 34 886 | 4/1994 | Germany . |
| 43 62 683 | 5/1993 | Japan . |

Primary Examiner—Michael Zanelli
Attorney, Agent, or Firm—Cohen, Pontani, Lieberman & Pavane

[57] ABSTRACT

A method of updating digital road maps which are used in traffic direction and guiding vehicles to their destinations. In the method actual route data is determined, stored and transmitted to a traffic computer by at least one test vehicle provided for the purpose. The traffic computer evaluates the information items contained in the route data and assigns them as attributes to the corresponding road sections of a digital road map. At least the actual geographical position of the test vehicle is automatically continually determined as route data and the attributes of the corresponding road sections of the road map are updated by reference to the route data. The attributes include at least the permissibility of driving over the road sections in at least one direction.

9 Claims, 2 Drawing Sheets

METHOD AND SYSTEM FOR UPDATING DIGITAL ROAD MAPS

BACKGROUND OF THE INVENTION

1. Field of the Invention

The invention relates to a method and a system for updating digital road maps which are used in particular for traffic direction and guiding vehicles to their destinations. In the method, actual route data is determined, stored and transmitted to a traffic computer by at least one test vehicle provided for that purpose. The traffic computer evaluates the information items contained in the route data and assigns them as attributes to the corresponding road sections of a digital road map.

2. Description of the Prior Art

From "ISATA—26th International Symposium on Automotive Technology and Automation", Aachen, Sep. 13–17, 1993, an interactive, dynamic road guidance system ("EURO-SCOUT" project) is known, in which specially equipped vehicles exchange messages with a traffic computer (control computer). The duplex communication is carried out in this case via beacons equipped with an infrared transmitting/receiving device, which are set up at all the important junction points of the road network. The vehicles, which are likewise equipped with a transmitting/receiving device, receive from the traffic computer via the beacons inter alia actual information items about the shortest routes to a desired destination. The main information source of the traffic computer is test vehicles which move and "swim along" with and in the traffic flow. These vehicles transmit to the traffic computer in particular their travel times between important traffic junction points, as well as waiting times at light signal installations. These information items are subsequently used by the traffic computer for road guidance and traffic direction, by, for instance, transmitting appropriate traffic control information items to the vehicles to be guided and outputting them via a control device on a display (for example one known from DE-A 4039887) in the vehicle.

In the case of this system, it is important that the traffic computer must already have an up-to-date road map for successful route guidance. This map includes the knowledge of specific properties of the individual road sections of the road network, which are designated below as attributes and can in particular comprise the ability to drive in a direction (one way streets), permissible vehicle height or vehicle width or vehicle weight and other such information items, and are widely indicated in the form of appropriate traffic signs. The updating of the road map is normally carried out by previous information items being obtained from appropriate state or municipal institutions or the road sections being regularly driven by special vehicles and changes being noted on the road map. Regularly driving the road network, however, represents a considerable effort in terms of personnel and economy, especially in large towns, since it is generally necessary to register beforehand all the facts which are subsequently intended to be checked by the operating personnel of the vehicle during driving over the roads of the road network.

In spite of this, deviations between the entries in the digital road map and the real situation in the road network repeatedly occur with respect to the ability to drive over road sections and permissible changes of direction at crossings and junctions, since as a rule it is not possible to check all the roads of the road network on one day although road blockages may have resulted, for example from construction work. Added to this is the fact that the personnel employed do not always work faultlessly, even given appropriate technical preconditions. However, in the case of an automated, computer controlled destination guidance, route planning and traffic direction system, faulty guidance to destinations, caused by a faulty road map, must be able to be excluded with a very high certainty. This quality criterion has as a consequence a distinctly higher priority than, for example, guidance to a destination along the shortest route. A slightly longer way is more easily tolerated than a forced turning maneuver because of the inability to drive over a road section.

SUMMARY OF THE INVENTION

It is the object of the present invention to provide a method and a system which permit continual updating of the digital road map employed for traffic direction and guiding vehicles to their destinations, with the result that above all very reliable guidance to destinations and traffic direction is possible. Moreover, the updating of the digital road map is intended to be able to be achieved with a relatively low economic effort.

Pursuant to this object, and others which will become apparent hereafter, one aspect of the present invention resides in a method for updating digital road maps which are used in traffic direction and guiding vehicles to their destinations, the method including the steps of determining actual route data with at least one test vehicle, the route data determining step including automatically continually determining at least an actual geographical position of the test vehicle. The route data is then stored on the test vehicle and transmitted from the test vehicle to a traffic computer. The traffic computer evaluates information items contained in the route data and assigns the information items as attributes to corresponding road sections of a digital road map. The attributes of the corresponding road sections of the digital road map are updated by reference to the route data. The attributes include an attribute indicating "an ability to drive over the road sections in at least one direction".

In another embodiment of the invention the updating of attributes includes setting the attribute "ability to drive over the road section in a specific direction" to "permissible" if a predetermined minimum number of test vehicles have either driven over the corresponding road section in a corresponding direction in a predetermined time interval or have made a corresponding change of direction at an intersection.

Still another embodiment of the invention includes setting the associated attribute "ability to drive over the road section in a specific direction" to "impressible" if, over a relatively long predetermined time interval, no test vehicle has either driven over the corresponding road section in a corresponding direction or has made a corresponding change of direction at an intersection.

A further embodiment of the invention includes determining route data by detecting traffic signs arranged along the road sections by optoelectronically registering, identifying and storing the traffic signs together with the determined geographical positions of the vehicle.

Yet another embodiment of the inventive method includes transmitting the route data to the traffic computer by radio telephone.

The invention provides that at least the actual geographical position of at least one test vehicle is automatically continually determined at intervals as route data. The attributes of the corresponding road sections of the road map are updated by reference to the route data, which comprises the route traveled by the test vehicle. In this case it is intended that the attributes contain at least the permissibility of driving over the road sections in at least one direction.

By this means the situation is reached where very many, if indeed not all, of the road sections which can actually be driven over with certainty are always known. In addition, the actually permitted changes of direction at very many road crossings and junctions of the road network are hence also known. The traffic direction and the guidance of the vehicles to their destinations is expediently carried out so that the automatic, computer-controlled destination guidance and traffic direction is carried out only via sections of the road network over which it is possible to drive with certainty, that is to say via such road sections whose drivability has recently been confirmed on the basis of appropriate route data.

The attributes are advantageously updated in a manner in which, by reference to the routes which are described by the route data, a comparison with the associated attributes of the digital road map is carried out so that the road sections are checked for their permissibility with respect to driving over the road sections in at least one direction, whereby at the same time checking with respect to the permissible changes of direction at road crossings or junctions is obtained. The associated corresponding attributes are set to "permissible" if a predefinable minimum number of test vehicles have driven over the corresponding road section in the corresponding direction in a predefinable first time interval, which means, for example, the permissibility of a corresponding change of direction at an intersection or junction. In the case of this method of updating, in addition, the associated attributes are expediently set to "impermissible" if, over a predefinable second time interval, no test vehicle has driven over the corresponding road section in the corresponding direction. In the case of a correspondingly large number of employed test vehicles, a very up-to-date digital road map is automatically available to the traffic computer as a result, following the updating by means of the method according to the invention. Use is advantageously made as test vehicles of, for example, the vehicles of a relatively large organizational unit, for example of a taxi company. Of course, the test vehicles need not necessarily belong to one organizational unit. For instance, it is also conceivable for a major part of the newly registered vehicles, following agreement with the owners, to be equipped with an appropriate device for the continuous automatic registration of the actual geographical opposition and for the transmission in anonymous form of this position data to the traffic computer.

To increase the certainty during the updating of the digital road map, it is proposed that the route data also comprises the traffic signs arranged in the road sections and at the crossings and junctions.

In this case, it is advantageous if the traffic signs are registered optoelectronically, for example by means of a video camera, are subsequently identified using EDP technology, are stored together with the determined location positions of the route and transmitted as route data at intervals to the traffic computer.

Only a very low expenditure in terms of infrastructure is necessary if the route data is transmitted to the traffic computer by means of a radio telephone. This can take place, for example, automatically during the night, in order thereby not to load the radio network during the normal traffic times.

A system provided within the framework of the invention for implementing the method according to the invention of updating digital road maps which are used in particular in traffic direction and guiding vehicles to their destinations has at least one test vehicle. Each test vehicle has the following equipment: a route data determining device for determining actual route data which describes at least the path traveled by the test vehicle in an interval, an installed memory unit for storing the determined route data, a data transmission device for transmitting route data to a traffic computer and a data bus via which the location position determining device, the memory and the data transmission device are connected to one another in terms of data. A further component is a traffic computer, which comprises at least one data receiving device and a digital road map, at least individual road sections of the digital road map being assigned attributes which identify at least the permissibility of driving over the road sections in at least one direction and which therefore identify at least the permissible changes of direction at crossings and junctions. The traffic computer is provided with a device for updating the attributes assigned to the road sections of the digital road map, the updating being carried out by reference to the route data transmitted from the test vehicles.

In order to reduce the amount of data to be transmitted to a minimum amount and hence to relieve the transmission channels, provision is advantageously made in the test vehicles of a device for data reduction of the route data. This device reduces the stored location position data, which determines a first vector train that describes the path traveled by the test vehicle in an interval, in such a way that the reduced location position data determines a second vector train and the maximum perpendicular distance of the vectors of the second vector train from the first vector train is less than a predefined threshold value. This reduction in the amount of data is carried out in the test vehicle, for example by means of a microcomputer provided for the purpose. A data reduction method of this type is known from the not previously published Patent Application DE 195 08 486.

Expediently, the registration of the traffic signs arranged in the road sections and at the crossings and junctions is carried out by a video camera installed in the test vehicle. The identification of the traffic signs can likewise be carried out by the microcomputer provided in the test vehicle.

In order to relieve the relatively expensive traffic computer of the effort of updating the road map, it is proposed that the device for updating the associated attributes has a separate processor unit.

The data transmission can be implemented with a low cost in terms of infrastructure if the data transmission device and the data receiving device are designed as the transmitting and receiving unit, respectively, of a radio telephone.

It is expedient to cause the updating of the attributes assigned to the road sections, crossings and junctions of the digital road map to be implemented by the updating device in accordance with a method described previously.

The invention will be explained in more detail below by reference to a system for updating digital road maps.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The FIG. 1 is a schematic representation of the inventive method and system.

DETAILED DESCRIPTION OF THE PREFERRED EMBODIMENTS

Figure 1:
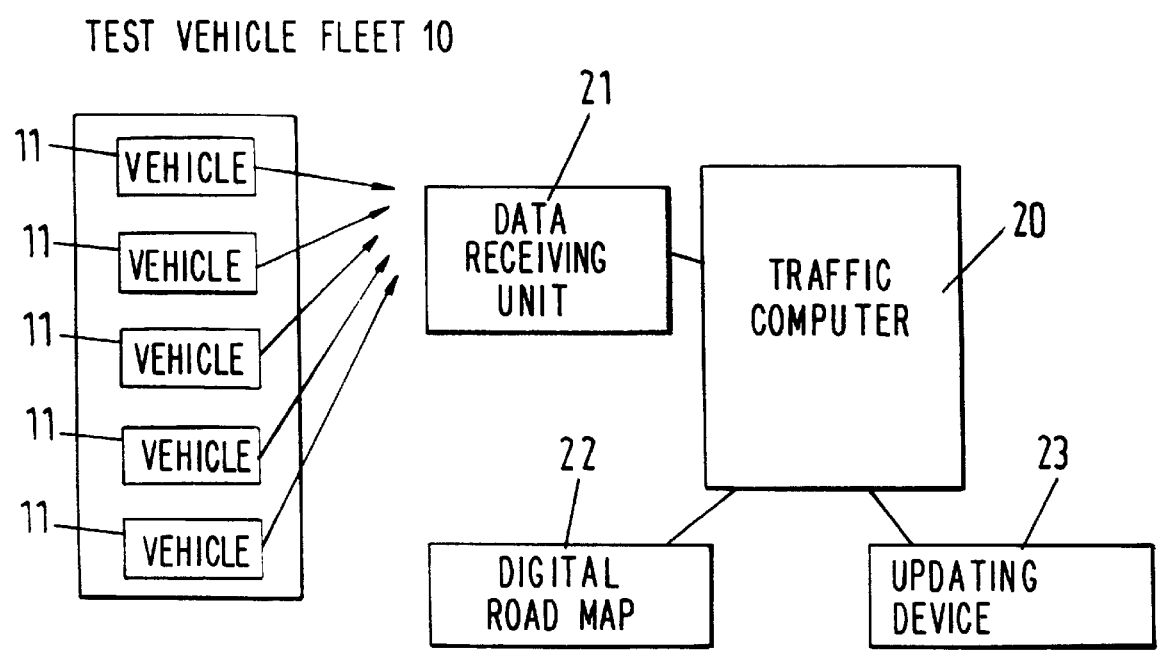
Figure 2:
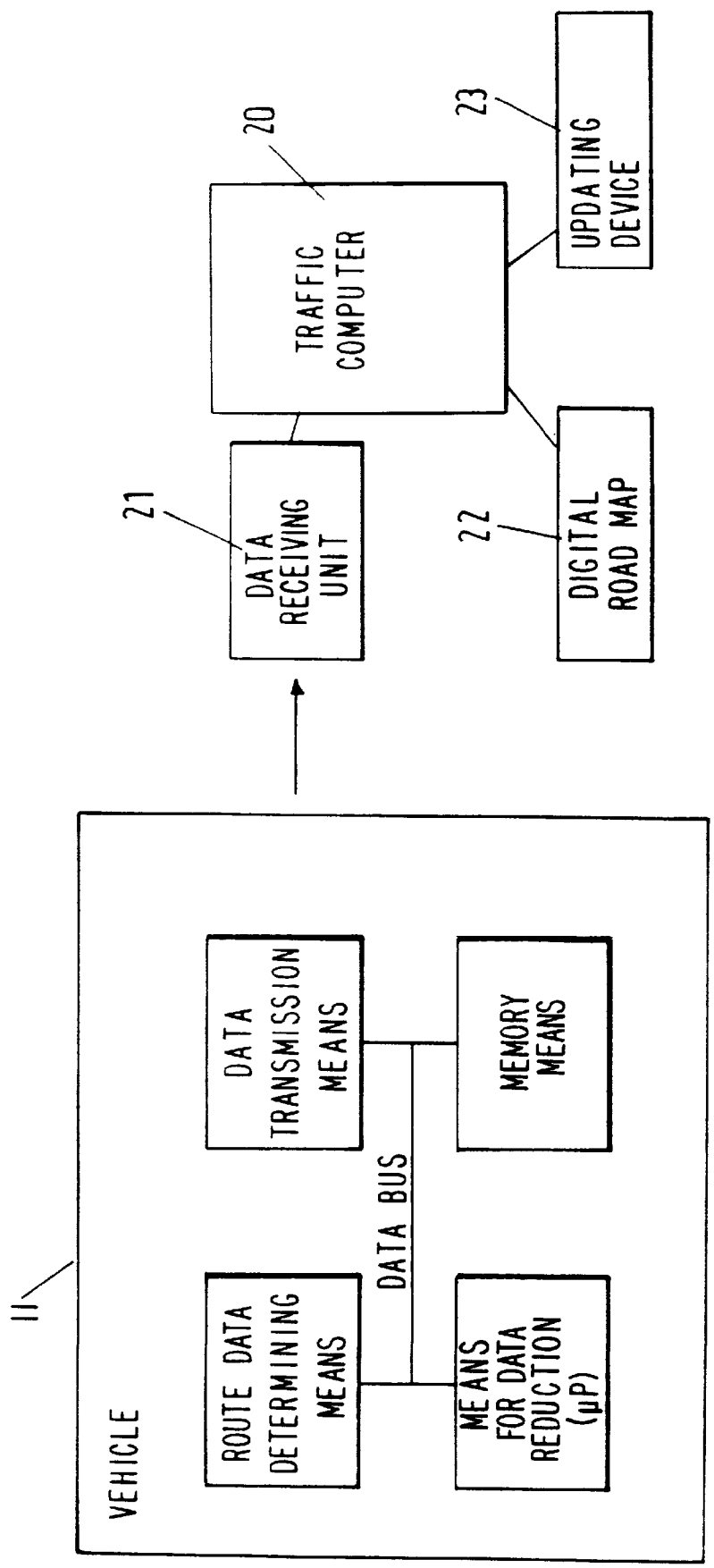
FIG. 2 is a block diagram showing the vehicle elements.

As shown in FIG. 1, a system for updating digital road maps has a plurality of test vehicles 11 of a test vehicle fleet 10, which does not have to be an organizational unit. The test vehicle fleet 10 can however be one organizational unit, for example the vehicles of a relatively large taxi company, which regularly move within a specific road network. In order to update digital road maps which relate only to specific vehicles (special vehicles, for example for dangerous goods transport) or vehicle classes, the organizational unit comprises only vehicles of the corresponding type or of the corresponding purpose of use. However, the above-mentioned test vehicles 11 can also be one single vehicle. In this arrangement (as seen in FIG. 2), each test vehicle 11 has at least the following equipment: a route data determining device, a memory unit, a data transmission device and a data bus, via which the route data determining device, the memory and the data transmission device are connected to one another in terms of data. In addition, the test vehicles 11 can of course also have their own digital road map.

The route data determining device makes possible the determination of the actual location position of the test vehicle 11. The route data is also able to contain further data apart from the location positions of the test vehicle 11, for example traffic signs arranged along the route. However, the device contains at least one location position determining device, for example a receiver of a navigational satellite system (e.g. GPS). The route data determining device is connected to the memory unit in terms of data via the data bus. The memory unit of the test vehicle 11 enables the progressive storage of the actually determined location position, the location positions together describing the path traveled by the test vehicle 11 in one interval (analogous to a "string of pearls"). The physical separation of the location positions does not necessarily need to be constant in this case. The physical separation can be aligned, for example, with the time interval between determining the actual location positions, the time interval of the location position determination being predefinable; in this case the physical separation would not be constant. It can in particular be a speed-dependent predefined value. If a minimum speed is not reached, it is expediently provided for the interval between the location position determinations to be carried out as a function of the path traveled, that is to say for example at a constant physical separation.

The data transmission device has a transmitting unit by means of which the connection to a traffic computer 20, arranged in a fixed location outside the test vehicle 11, can be established and the route data which have been registered and, if required, conditioned, can be transmitted to the traffic computer 20.

The traffic computer 20 comprises at least one data receiving unit 21 and a digital road map 22 stored in a data memory. At least individual road sections of the digital road map 22 are assigned attributes (for example in the form of status vectors or attributes stored in the digital road map 22 in the corresponding data sets). The attributes contain at least the permissibility of driving over the road sections in at least one direction and contain at least the permissible changes of direction at crossings and junctions. This is implemented by the individual directions of a road section in each case being assigned a status vector which can be set into the actual status "permissible" or "impermissible".

The traffic computer 20 is also provided with an updating device 23, which makes possible the updating of the attributes assigned to the road sections of the digital road map. The updating is carried out with the aid of a comparison device by reference to the route data transmitted from the test vehicles 11. The updating device 23 has access to the status vectors of the digital road map 22 and can set the status of the status vectors to "permissible" or "impermissible". The updating of the status vectors can of course also be carried out manually. In particular, it is possible to evaluate the driving directions determined as "impermissible" and to use them as the starting point for targeted checks on the corresponding road sections.

In order to reduce the amount of data to be transmitted as far as possible and without significant information losses, provision is made in the test vehicles 11, in one embodiment of the invention, for a device for data reduction which reduces the stored location position data, which determines a first vector train that describes the path traveled by the test vehicle 11 in an interval (as shown in FIG. 2). The data reduction is carried out so that the reduced location position data determines a second vector train, the maximum perpendicular distance of the vectors of the second vector train from the first vector train being smaller than a predefined threshold value. This reduction in the amount of data is carried out in the test vehicle 11, for example by means of a microcomputer and a computer program.

In addition, a video camera can be installed in each of the test vehicles 11 for registering the traffic signs arranged in the road sections and at crossings and junctions. The assignment of the traffic signs by evaluating the recorded images of the video camera can likewise be carried out by the microcomputer provided.

To relieve the expensive traffic computer 20 of the effort of updating the road map 22 for updating the attributes assigned to the road sections of the digital road map 22, the updating device 23 is preferably provided with a separate processor unit.

For the purpose of data transmission from the test vehicle 11 to the traffic computer 20, the data transmission device and the data receiving device 21 are, for example, designed as the transmitting and receiving unit, respectively, of a radio telephone. However, other data transmission devices are also conceivable.

In the case of using the system for updating digital road maps, a multiplicity of test vehicles preferably move on the roads within a predefined road network. The individual driving paths of the individual test vehicles may in this case be random, in particular if these are the vehicles of a relatively large taxi company which are equipped with the corresponding test vehicle devices. During the journey, the route data determining devices determine at intervals the respective actual location positions. These are then forwarded to the memory device, which is also carried, directly after the determination or intermediately processed, and are stored in a memory. In addition, the traffic signs which are set up on the roads are optoelectronically registered by the video camera, are identified by the computer and stored as part of the route information items in the memory. In an alternative configuration, all the traffic signs are provided with miniature transmitters which transmit an appropriate identification which, for example, contains the identification number of the traffic sign, the identification numbers likewise being stored as part of the route information items in the memory. After the journey has been completed, the route data are automatically transmitted in a form which makes them anonymous to the traffic computer 20 by means of a radio telephone.

The traffic computer 20 collects the transmitted route data in an area of memory which is specifically provided therefor. At a suitable time, for example overnight, the route data are conditioned, that is to say the corresponding routes are determined and converted into a series of road sections of the digital road map 22. Since the location positions determined, for example by the GPS receiver, have a certain location inaccuracy, the conditioning of the route data includes, for example, so-called map matching, that is to say the "unsharp" routes are matched into the road map 22 taking into account the possible error tolerance and are assigned to the corresponding road sections of the digital road map 22. However, the assignment can also be carried out in accordance with a DGPS correction of at least some location positions, which are then available with sufficient precision, with or without subsequent map matching. After this, the updating device checks the attributes assigned to the road sections of the digital road map by reference to the conditioned route data, that is to say also taking into account the determined traffic signs. The traffic signs to be taken into account include, for example, "no left turn", "one way street", etc. If a predefined number of test vehicles 11 have driven over a specific road section within a predefined time span, that is to say for example within the last two days, in one of the possible directions, the status vector of the corresponding direction of the corresponding road section is set to "permissible".

In this arrangement, the updating device records all the road sections for, for example, a freely predefinable region which have been updated within a previous time span, that is to say for example within the last ten days. In order to exclude faulty destination guidance and traffic directions, all those road sections which have not been updated within the last ten days are expediently set to "impermissible". In the case of a sufficiently large number of test vehicles 11, it is possible to achieve reliable updating using this method, which can furthermore be executed completely automatically. Since the road sections which have not been driven over during a specific relatively long time span are also taken into account by setting the status vector to "impermissible", no destination guidance or traffic direction takes place via these areas of the road network; therefore faulty destination guidance and traffic direction are virtually excluded, but at the least very sharply reduced.

The invention is not limited by the embodiments described above which are presented as examples only but can be modified in various ways within the scope of protection defined by the appended patent claims.

We claim:

1. A method for updating digital road maps which are used in traffic direction and guiding vehicles to their destinations, comprising the steps of: determining actual route data with at least one test vehicle, the route data determining step including automatically continually determining at least an actual geographical position of the test vehicle; storing the route data on the test vehicle; transmitting the route data from the test vehicle to a traffic computer; evaluating information items contained in the route data with the traffic computer and assigning the information items as attributes to corresponding road sections of a digital road map; and updating the attributes of the corresponding road sections of the digital road map by reference to the route data, the attributes comprising at least an attribute indicating an ability to drive over the road sections in at least one direction, the step of updating associated attributes including setting the associated attribute "ability to drive over the road section in a specific direction" to "permissible" if a pre-defined minimum number of test vehicles have one of driven over the corresponding road section in a corresponding direction in a predefined time interval, and made a corresponding change of direction at an intersection.

2. A method for updating digital road maps which are used in traffic direction and guiding vehicles to their destinations, comprising the steps of: determining actual route data with at least one test vehicle, the route data determining step including automatically continually determining at least an actual geographical position of the test vehicle; storing the route data on the test vehicle; transmitting the route data from the test vehicle to a traffic computer; evaluating information items contained in the route data with the traffic computer and assigning the information items as attributes to corresponding road sections of a digital road map; and updating the attributes of the corresponding road sections of the digital road map by reference to the route data, the attributes comprising at least an attribute indicating an ability to drive over the road sections in at least one direction, the step of updating attributes including setting the associated attribute "ability to drive over the road section in a specific direction" to "impermissible" if, over a relatively long predefined time interval, no test vehicle has one of driven over the corresponding road section in a corresponding direction and made a corresponding change of direction at an intersection.

3. A method for updating digital road maps which are used in traffic direction and guiding vehicles to their destinations, comprising the steps of: determining actual route data with at least one test vehicle, the route data determining step including automatically continually determining at least an actual geographical position of the test vehicle; storing the route data on the test vehicle; transmitting the route data from the test vehicle to a traffic computer; evaluating information items contained in the route data with the traffic computer and assigning the information items as attributes to corresponding road sections of a digital road map; and updating the attributes of the corresponding road sections of the digital road map by reference to the route data, the attributes comprising at least an attribute indicating an ability to drive over the road sections in at least one direction, the step of determining route data including detecting traffic signs arranged along the road sections.

4. A method as defined in claim 3, including optoelectronically registering, identifying and storing the traffic signs together with the determined geographical positions of the vehicle along the route.

5. A system for updating digital road maps which are used in traffic direction and guiding vehicles to their destinations, comprising: traffic computer means; and at least one test vehicle including route data determining means for automatically determining actual route data which describes at least a path traveled by the test vehicle in an interval, memory means for storing the determined route data, data transmission means for transmitting route data to the traffic computer, and a data bus that interconnects the route data determining means, the memory means and the data transmission means in a data transmissive manner, the traffic computer means including data receiving means and a digital road map, the digital road map having individual road sections that are assigned attributes which represent at least an ability to drive over the road sections in at least one direction, the traffic computer further including updating means for updating the attributes assigned to the road sections of the digital road map by reference to the route data transmitted from the test vehicle, the test vehicle further including means for data reduction of the route data, the data reduction means being operative to reduce stored location position data, which determines a first vector train that describes the path travelled by the test vehicle in the interval, so that the reduced location position data determines a second vector train, a maximum perpendicular distance of the vectors of the second vector train from the first vector train being less than a predetermined threshold value.

6. A system as defined in claim 5, wherein the data reduction means includes a microprocessor.

7. A system for updating digital road maps which are used in traffic direction and guiding vehicles to their destinations, comprising: traffic computer means; and at least one test vehicle including route data determining means for automatically determining actual route data which describes at least a path traveled by the test vehicle in an interval, memory means for storing the determined route data, data transmission means for transmitting route data to the traffic computer, and a data bus that interconnects the route data determining means, the memory means and the data transmission means in a data transmissive manner, the traffic computer means including data receiving means and a digital road map, the digital road map having individual road sections that are assigned attributes which represent at least an ability to drive over the road sections in at least one direction, the traffic computer further including updating means for updating the attributes assigned to the road sections of the digital road map by reference to the route data transmitted from the test vehicle, the route data determining means including a video camera operative to register traffic signs arranged along the road sections.

8. A system for updating digital road maps which are used in traffic direction and guiding vehicles to their destinations, comprising: traffic computer means; and at least one test vehicle including route data determining means for automatically determining actual route data which describes at least a path traveled by the test vehicle in an interval, memory means for storing the determined route data, data transmission means for transmitting route data to the traffic computer, and a data bus that interconnects the route data determining means, the memory means and the data transmission means in a data transmissive manner, the traffic computer means including data receiving means and a digital road map, the digital road map having individual road sections that are assigned attributes which represent at least an ability to drive over the road sections in at least one direction, the traffic computer further including updating means for updating the attributes assigned to the road sections of the digital road map by reference to the route data transmitted from the test vehicle, the updating means being operative to set the associated attribute "ability to drive over the road section in a specific direction" to "permissible" if a predetermined minimum number of test vehicles have one of driven over the corresponding road section in a corresponding direction in a predefined time interval, and made a corresponding change of direction at an intersection.

9. A system for updating digital road maps which are used in traffic direction and guiding vehicles to their destinations, comprising: traffic computer means; and at least one test vehicle including route data determining means for automatically determining actual route data which describes at least a path traveled by the test vehicle in an interval, memory means for storing the determined route data, data transmission means for transmitting route data to the traffic computer, and a data bus that interconnects the route data determining means, the memory means and the data transmission means in a data transmissive manner, the traffic computer means including data receiving means and a digital road map, the digital road map having individual road sections that are assigned attributes which represent at least an ability to drive over the road sections in at least one direction, the traffic computer further including updating means for updating the attributes assigned to the road sections of the digital road map by reference to the route data transmitted from the test vehicle, the updating means being operative to set the associated attribute "ability to drive over the road section in a specific direction" to "impermissible" if, over a relatively long predefined time interval, no test vehicle has one of driven over the corresponding road section in a corresponding direction and made a corresponding change of direction at an intersection.

* * * * *